March 9, 1926.
F. H. MEYER
CUSHION TIRE STRUCTURE
Filed Nov. 25, 1922
1,576,206
2 Sheets-Sheet 1
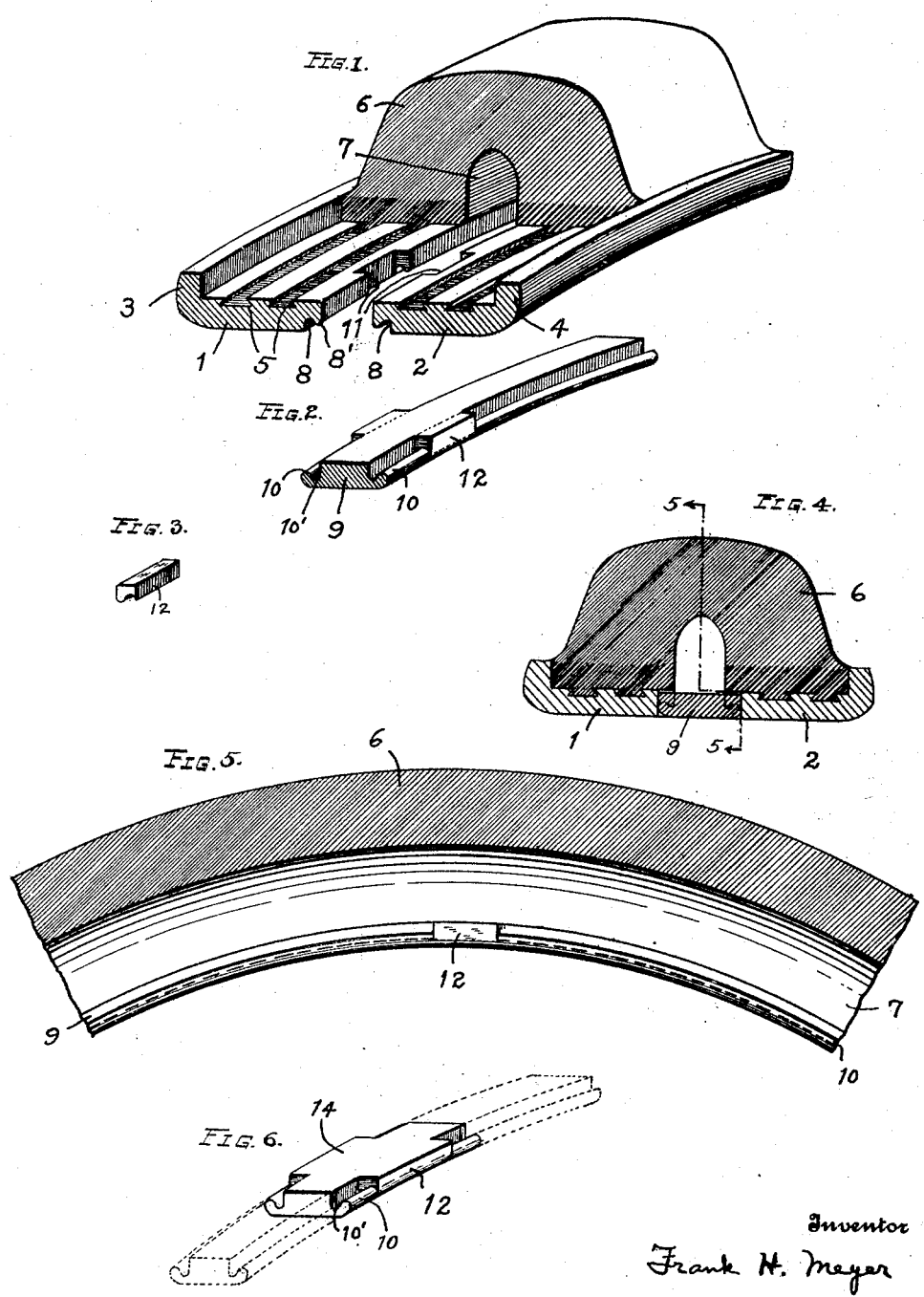

March 9, 1926.
F. H. MEYER
1,576,206
CUSHION TIRE STRUCTURE
Filed Nov. 25, 1922  2 Sheets-Sheet 2
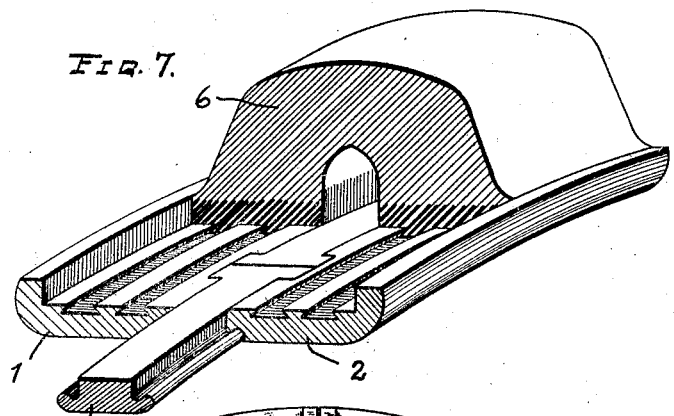
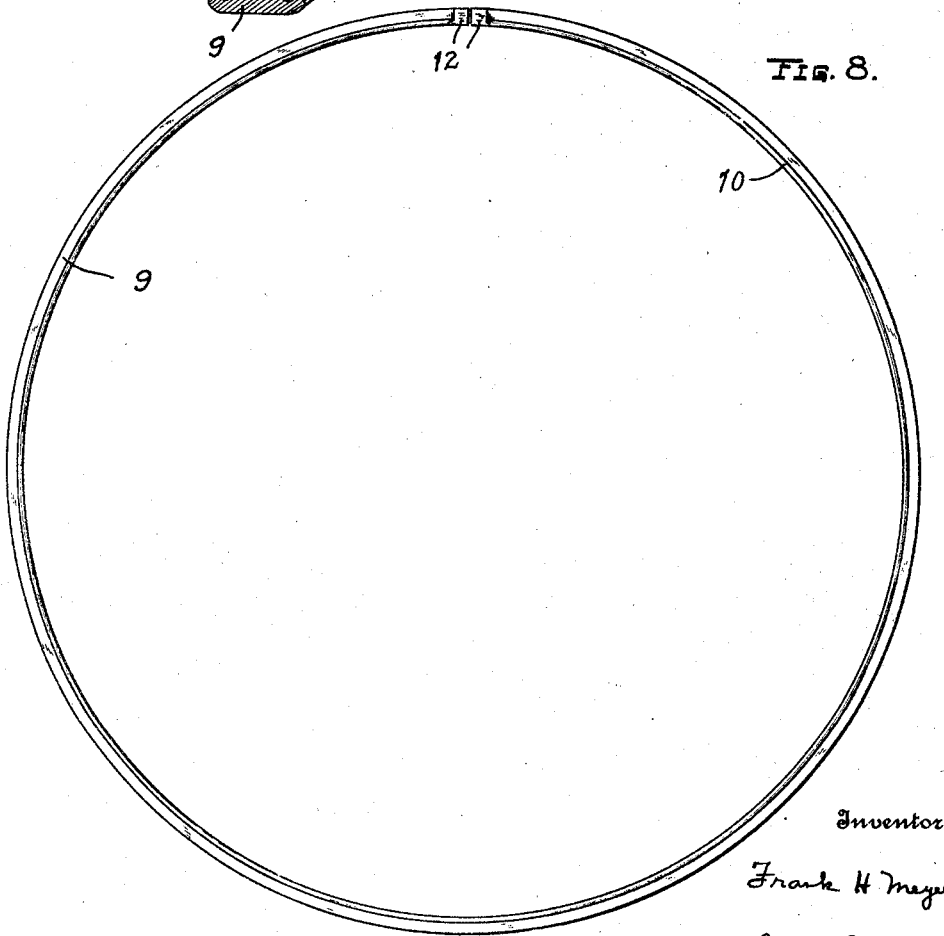
Inventor
Frank H Meyer
Lloyd L. Evans
Attorney Patented Mar. 9, 1926.

1,576,206

UNITED STATES PATENT OFFICE.

FRANK H. MEYER, OF WARREN, OHIO.

CUSHION-TIRE STRUCTURE.

Application filed November 25, 1922. Serial No. 603,289.

*To all whom it may concern:*

Be it known that I, FRANK H. MEYER, a citizen of the United States, residing at Warren, in the county of Trumbull and State of Ohio, have invented a certain new and useful Improvement in Cushion-Tire Structures, of which the following is a full, clear, and exact description, reference being had to the accompanying drawings.

This invention relates to tire structures and pertains more particularly to cushion tires of the type in which a tire with an inner recess or channel is molded and cured directly upon a tire base.

It is an object of the present invention to provide a cushion tire structure in which a spacing ring is expanded or stretched and interlocks with side sections having a tire structure secured thereto to form with said side sections a rigid base which is adapted to be forced laterally upon the fixed rim of a wheel structure.

A further object of this invention is to provide a sectional rim or base in which the central spacing ring and the outer base sections have connecting means preventing relative circumferential movement as well as relative lateral movement.

Another object of the invention is to provide such connecting means that the ring can be removed without damaging the side sections.

Other objects will be apparent from the following description and annexed drawings.

Reference should be had to the accompanying drawings forming a part of this specification in which—

Figure 1 is a fragmentary perspective view partly in section showing the side members of the rim and the cushion tire.

Fig. 2 is a fragmentary perspective view of a portion of the locking ring.

Fig. 3 is a detail view of a lug prior to its attachment to the ring.

Fig. 4 is a transverse section through a completed rim.

Fig. 5 is a circumferential central section through the rim.

Fig. 6 shows a different way of forming the locking ring.

Fig. 7 is a fragmentary sectional view showing a modified form of ring.

Fig. 8 is an elevation of the ring used in the modification.

Referring to the drawing, the tire base is made up of a pair of annular side sections 1 and 2 which are preferably endless rings and are provided with outturned flanges 3 and 4 and peripheral locking grooves 5 for receiving the rubber tire 6. The rubber tire is of the type recessed or channeled as at 7 between the side portions, which are secured to the rim base sections 1 and 2 in a well known manner, wherein a layer of hard rubber is interlocked with suitable grooves in the base sections and the soft rubber of the tire is united to the hard rubber.

At their inner edges the sections 1 and 2 are grooved circumferentially at 8 to form ribs 8′ to interlock with a spacing structure such as ring 9 having complementary members such as ribs 10 and grooves 10′. The spacing ring 9 is of slightly smaller diameter than the sections 1 and 2 and is stretched or expanded into place in any suitable manner after the rubber tire is vulcanized on to the said sections and the cores removed.

By omitting the spacing ring until after the tire sections are secured to the base sections, an unobstructed space is provided between the side sections of the base for the insertion and removal of the core for the recess in the tire while it is vulcanized to the base sections.

The central portion of the ring 9 extends between the side sections 1 and 2 and with the interlocking connections prevents relative movement laterally of the sections when they are applied to the fixed rim of a wheel body. It is desirable, however, that these members be locked against relative circumferential or longitudinal movement so that neither of the side sections can creep circumferentially with respect to the other. For this purpose the side sections 1 and 2 are formed with notches 11 adapted to receive lugs 12 on the locking ring 9 to firmly lock the ends of the ring against movement when the ring 9 is expanded into place between the sections 1 and 2.

The opposed notches 11 may be formed in any desired shape, but preferably are simply square notches punched from the opposing edges of the sections 1 and 2 and the lugs 12 may be formed separately and welded into place on the ring 9. Or if desired, the lugs 12 may be formed as by forging integrally with a piece of metal whose ends are shaped to match the ring 9 in cross section. In this case, as shown in Fig. 6, the insert 14 is welded at both ends to the ends of the ring 9.

To complete the tire structure the ring 9 is placed with the lugs 12 engaging the recesses 11 of the side sections upon an expanding machine (not shown) and the locking ring is then stretched to bring the flanges 10 throughout the remainder of the ring into engagement with the grooves 8 of the sections 1 and 2. For a fuller decription and explanation of the expanding machine reference is had to the copending application Ser. No. 570,615, filed June 24, 1922 by F. R. Klaus and F. H. Meyer, which issued on July 10, 1923 as Patent No. 1,461,531.

While the spacing ring is preferably endless and of one piece, it may be split and have the ends held in any suitable manner while stretching. Fig. 7 shows an example of one method of holding the ends of a split ring while the body of the ring is stretched into place. In this case the ring is split transversely through the lugs 12 so that each end and the side sections have interfitting lugs and recesses to hold them against movement while stretching the ring. So far as such movement and the stretching is concerned, it is only necessary that the side sections and the spacing ring carry connecting means to hold the ends of the ring or ring sections so that the body of the ring will be stretched into engagement with the side sections 1 and 2. Such means may be lugs and recesses and may be a part of either the ring or side sections. In any of these forms, however, the spacing ring is placed between the side sections so that such portions interfit and the ring is then stretched to bring it into engagement with the rim sections 1 and 2 throughout its circumference.

The ribs 10 and grooves 10' of the spacing ring and the ribs 8' and grooves 8 of the side sections 1 and 2 are preferably dovetailed or undercut at such an angle that the stretching of the ring into complete engagement with the side sections is facilitated and so that they will be accurately spaced and interlocked against lateral separation when the ring is finally in position.

The ring may even be made of sections which will permit stretching to a larger diameter and will interlock with the side sections to form a rigid tire structure. The inner face of the ring 9 is preferably expanded so that it is of substantinally the same inner diameter as the inner faces of the side sections. The corners of the ring 9 are preferably rounded to facilitate pressing the tire structure on to the fixed rim of a wheel body in the ordinary manner.

When a tire is defective or worn or when it is desired to reassemble the tire structure for any reason after it has been removed from the wheel, the central ring can be pressed radially inwardly and removed without damage or injury to the side sections, which can thus be reclaimed for use in connection with another tire body.

It will be noticed that the side sections and the ring frictionally engage the wheel throughout substantially the entire area of their inner faces so that the tire member is securely held in place. Also when the tire base is mounted on the fixed rim of a wheel body the sections of the base are held against relative circumferential and lateral movement and these sections due to their frictional engagement with each other and the tensioning in applying them to the fixed rim of the wheel are held against relative radial movement. Such a construction is as rigid in use as though the rim and side sections were permanently secured, as by welding, but the ring can be removed to reclaim the side sections for reuse.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A cushion tire structure comprising side sections and a spacing and locking ring between them, said ring having circumferential ribs and grooves to interlock with the corresponding grooves and ribs upon the side sections, and said ring having lugs to engage recesses in the side sections to prevent relative circumferential movement.

2. A cushion tire structure comprising annular side sections having a cushion of rubber secured thereto, a spacing ring mounted between said side sections, said sections and ring having interfitting means to prevent relative circumferential movement, and having complementary members in circumferential engagement to rigidly secure said side sections and ring together.

3. A tire base or rim structure comprising annular side sections and a spacing ring interposed therebetween, said sections and ring having interfitting means to prevent relative circumferential movement and a rubber tire secured to said side sections.

4. A cushion tire structure comprising a pair of spaced-apart base members, a cushion of rubber vulcanized to said base members and spanning their intervening space, and a spacing member so interfitted and interlocked with said base members as to prevent both circumferential and lateral relative movement between the same, the innermost part of said spacing member lying substantially within the radial limits of said base members.

5. A cushion tire structure comprising annular side sections, having an arched cushion of rubber vulcanized thereto, and a spacing ring between said sections, said sections and ring being formed with complementary interfitting means, said interfitting means being adapted to prevent relative lateral and relative circumferential movement of the side sections.

6. A cushion tire structure comprising a pair of side sections, having an arched cushion tire secured thereto, a spacing and locking member positioned between said sections, said member and sections being formed with complementary interlocking means to substantially prevent relative lateral and circumferential movement of the sections.

7. A cushion tire structure comprising a pair of side sections, having a cushion tire body secured thereto, a spacing member positioned between said sections with its inner face of substantially the same diameter as the side sections, said member and side sections having interfitting means, said interfitting means being adapted to prevent relative lateral and circumferential movement of the side sections but which will permit removal radially of said spacing member.

8. A cushion tire structure comprising a pair of side sections having a cushion tire body secured thereto, a transversely split annular spacing member interposed between said sections with its inner face of substantially the same diameter as the side sections, said spacing member and side sections having interfitting means disposed adjacent the ends of the spacing member, said interfitting means being adapted to prevent relative circumferential movement of the side sections and to permit stretching of said spacing member into position between the side sections.

In testimony whereof, I hereunto affix my signature.

FRANK H. MEYER.